(12) United States Patent
Ahn et al.

(10) Patent No.: US 7,043,238 B2
(45) Date of Patent: May 9, 2006

(54) CDMA TERMINAL FOR PROVIDING ROAMING SERVICE TO GSM SERVICE SUBSCRIBER IN CDMA SERVICE AREA

(75) Inventors: Byung-Ik Ahn, Seoul (KR); Chan-Ho Yun, Koyang (KR); Yuon-Pil Jeung, Seoul (KR); Kwang-Wouk Lee, Kyungki-do (KR); Cheol-Hyun Kang, Seoul (KR); Seong-Jin Choi, Seoul (KR)

(73) Assignee: Ktfreetel Co., Ltd., Seoul (KR)

( * ) Notice: Subject to any disclaimer, the term of this patent is extended or adjusted under 35 U.S.C. 154(b) by 593 days.

(21) Appl. No.: 10/089,010

(22) PCT Filed: Jan. 31, 2002

(86) PCT No.: PCT/KR02/00145

§ 371 (c)(1),
(2), (4) Date: Mar. 25, 2002

(87) PCT Pub. No.: WO02/078380

PCT Pub. Date: Oct. 3, 2002

(65) Prior Publication Data

US 2003/0148791 A1     Aug. 7, 2003

(51) Int. Cl.
*H04Q 7/20* (2006.01)
*H04M 1/00* (2006.01)

(52) U.S. Cl. ............... 455/432.1; 455/558; 455/426.1; 455/552.1; 455/550.1

(58) Field of Classification Search ............... 455/559, 455/558, 552.1, 426.1, 410, 411, 432.1, 432.2, 455/550.1; 370/331
See application file for complete search history.

(56) References Cited

U.S. PATENT DOCUMENTS

| 5,537,474 A | * | 7/1996 | Brown et al. ............... 380/248 |
| 5,619,491 A | * | 4/1997 | Panzer ....................... 370/342 |
| 5,862,481 A | * | 1/1999 | Kulkarni et al. ......... 455/432.2 |
| 5,987,325 A | * | 11/1999 | Tayloe ..................... 455/435.2 |
| 6,438,117 B1 | * | 8/2002 | Grilli et al. ................ 370/331 |
| 6,714,799 B1 | * | 3/2004 | Park et al. .................. 455/558 |

FOREIGN PATENT DOCUMENTS

| EP | 0 786 915 A2 | | 7/1997 |
| EP | 1 059 822 A2 | | 12/2000 |
| GB | 2 345 825 A | | 7/2000 |
| KR | 10-2000-0031583 | | 6/2000 |
| KR | 2002021542 A | * | 3/2002 |

* cited by examiner

*Primary Examiner*—George Eng
*Assistant Examiner*—Wesley Kim
(74) *Attorney, Agent, or Firm*—Alston & Bird LLP

(57) ABSTRACT

Disclosed is a CDMA terminal for providing a CDMA service to a global system for mobile communications (GSM) service subscriber in a CDMA service area which comprises: a subscriber identity module (SIM) cardholder for installing or uninstalling a SIM card of a GSM service subscriber, wherein when a SIM card of the GSM service subscriber is installed in the SIM cardholder in the CDMA service area, specific data are transmitted using a CDMA message in the case of authenticating the GSM service subscriber using information on the GSM service subscriber stored in the SIM card, and when the authentication of the GSM service subscriber is normally completed, the CDMA terminal is used for the GSM service subscriber as a roaming service terminal in the CDMA service area. According to the present invention, the GSM service subscriber can use his SIM card and number in the CDMA service area.

8 Claims, 6 Drawing Sheets

CDMA TERMINAL FOR PROVIDING ROAMING SERVICE TO GSM SERVICE SUBSCRIBER IN CDMA SERVICE AREA

BACKGROUND OF THE INVENTION (a) Field of the Invention

The present invention relates to a roaming service system for global system for mobile communications (GSM) service subscribers in a code division multiple access (CDMA) service area, a location registering method, a call transmitting and receiving method, and a short message (SM) transmitting and receiving method using the roaming service system. More specifically, the present invention relates to a roaming service system for GSM service subscribers in a CDMA service area, a location registering method, a call transmitting and receiving method, and a SM transmitting and receiving method using the roaming service system when a GSM service subscriber installs a subscriber identity module (SIM) card in a CDMA terminal and receives a roaming service in a CDMA service area.

(b) Description of the Related Art

Recently, as demands for mobile communications have greatly increased, requests for global roaming services that enable telephoning all around the world using a single phone number have multiplied.

When a foreign GSM service subscriber comes to Korea and attempts to receive a CDMA service, the subscriber must borrow a new terminal from an airport lounge or a mobile service agency and obtain a new subscriber number instead of using the subscriber's previous number.

In particular, in the GSM method, the subscriber installs a SIM card that holds the subscriber's profile, in the subscriber's terminal. This mobile communication method using a SIM card enables any subscriber to borrow a SIM-using terminal, install the subscriber's SIM card in the terminal, and use the subscriber's original number in any country where the GSM service is used. However, in Korea, where the CDMA service is provided instead of the GSM method, the GSM subscribers cannot use their original numbers using the SIM cards.

Recently, the countries that use the CDMA method have gradually been attempting to adopt user identity module (UIM) cards similar to the SIM cards to make use of advantages of the SIM cards. Accordingly, CDMA terminals that accommodate the UIM cards are also being developed. The SIM card is identical to the UIM card in its size so it can be installed in the CDMA terminal, but it is impossible to use a CDMA terminal with an installed SIM card and receive the mobile communication service because of differences between the CDMA service method and the GSM service method.

SUMMARY OF THE INVENTION

It is an object of the present invention to install a GSM-type SIM card, use the existing CDMA network, and provide a roaming CDMA terminal.

In one aspect of the present invention, a CDMA terminal for providing a CDMA service in a CDMA service area comprises: a SIM cardholder for installing or uninstalling a SIM card of a GSM service subscriber, wherein when a SIM card of a GSM service subscriber is installed in the SIM cardholder in the CDMA service area, specific data are transmitted using a CDMA message in the case of authenticating the GSM service subscriber using information on the GSM service subscriber stored in the SIM card, and when the authentication of the GSM service subscriber is normally completed, the CDMA terminal is used for the GSM service subscriber as a roaming service terminal in the CDMA service area.

The CDMA terminal comprises: a wireless signal transmitter for transmitting and receiving wireless signals; a mobile station modem (MSM) connected to the wireless signal transmitter, for controlling the CDMA terminal; a SIM interface for communicating data between the MSM and the SIM cardholder; a speaker for outputting speech data output by the MSM to a CDMA terminal user in a speech format; a microphone for converting speech input by the CDMA terminal user into speech data, and outputting them to the MSM; a liquid crystal display (LCD) connected to the MSM, for displaying information to the CDMA terminal user; a key input unit for receiving a key input of the CDMA terminal user, and transmitting it to the MSM; and a memory connected to the MSM, for storing various data.

In another aspect of the present invention, a CDMA terminal comprises: a cardholder for installing and uninstalling a UIM of a CDMA service subscriber; and a card interface for detecting whether a UIM card is installed in the cardholder, wherein when the card interface detects that the UIM card of the CDMA service subscriber is installed in the cardholder in the CDMA service area, the CDMA service subscriber can use the CDMA service. The cardholder can install or uninstall the SIM card of the GSM service subscriber, and the card interface can detect whether the SIM card is installed in the cardholder, and when the card interface detects that the SIM card of the GSM service subscriber is installed in the cardholder in the CDMA service area, specific data are transmitted using a CDMA message in the case of authenticating the GSM service subscriber using information of the GSM service subscriber stored in the SIM card. When the authentication of the GSM service subscriber is normally completed, the CDMA terminal operates as a roaming terminal for the GSM service subscriber in the CDMA service area.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
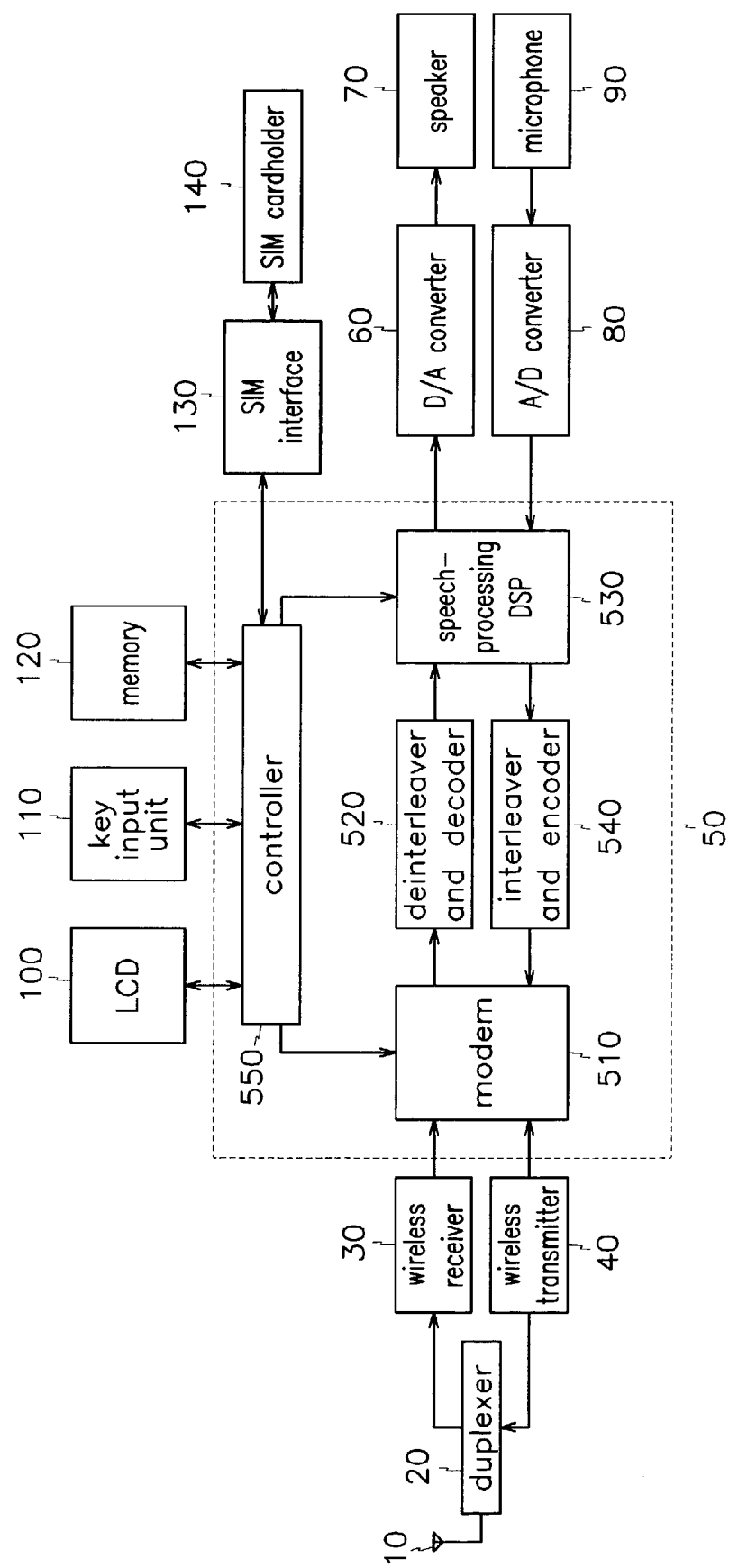
FIG. 1 shows a block diagram of a CDMA terminal that provides a roaming service to a GSM service subscriber in the CDMA service area according to a first preferred embodiment of the present invention.

FIG. 1 shows a block diagram of a CDMA terminal that provides a roaming service to a GSM service subscriber in a CDMA service area according to a first preferred embodiment of the present invention.

As shown, a CDMA terminal for providing a roaming service to a GSM service subscriber in a CDMA service area according to a preferred embodiment of the present invention comprises an antenna 10, a duplexer 20, a wireless receiver 30, a wireless transmitter 40, a mobile station modem (MSM) 50, a digital/analog (D/A) converter 60, a speaker 70, an analog/digital (A/D) converter 80, a microphone 90, a liquid crystal display (LCD) 100, a key input unit 110, a memory 120, and a SIM interface 130.

The antenna 10 transmits received wireless signals to the duplexer 20, and the duplexer 20 separates the wireless signals into transmission signals and receiving signals, and transmits the receiving signals to the wireless receiver 30.

The wireless receiver 30 amplifies the wireless signals transmitted by the duplexer 20, suppresses the amplified signals, converts the suppressed signals into intermediate frequency (IF) signals according to a specific local oscillation frequency signal, suppresses them into re-established IF band signals, performs gain adjustment on the suppressed signals to a uniform level, down-converts them, and outputs them to the MSM 50.

The MSM 50 demodulates the signals output by the wireless receiver 30, de-interleaves and decodes the demodulated signals, performs speech signal processing on them, and outputs them as digital speech signals. The digital speech signals output by the MSM 50 are converted into analog speech signals by the D/A converter 60, and they are output to a CDMA terminal user through the speaker 70.

When receiving the speech signals from the CDMA terminal user through the microphone 90, the A/D converter 80 converts them into digital speech signals and inputs them to the MSM 50.

The MSM 50 performs signal processing on the speech signals input by the A/D converter 80, interleaves and encodes the corresponding signals, modulates them, and outputs them to the wireless transmitter 40.

The wireless transmitter 40 up-converts the signals output by the MSM 50, performs gain adjustment on them, converts the gain-adjusted signals into wireless signals, amplifies corresponding power, and outputs them to the duplexer 20.

The duplexer 20 separates the signals output by the wireless transmitter 40 into transmission signals, and transmits them though the antenna 10.

The MSM 50 comprises a modem 510; a de-interleaver and decoder 520; a digital signal processor (DSP) 530 for processing speech signals; an interleaver and encoder 540; and a controller 550.

The modem 510 demodulates the signals output by the wireless receiver 30 according to the CDMA protocol, and outputs them to the de-interleaver and decoder 520, and it also modulates the signals output by the interleaver and encoder 540 according to the CDMA protocol and outputs them to the wireless transmitter 40.

The de-interleaver and decoder 520 de-interleaves and decodes the signals output by the modem 510, and outputs them to the DSP 530. The interleaver and encoder 540 interleaves and encodes the signals output by the DSP 530 and outputs them to the modem 510.

The DSP 530 for processing speech signals performs speech processing on the signals output by the de-interleaver and decoder 520, outputs digital speech data to the D/A converter 60, performs speech processing on the digital speech data output by the A/D converter 80, and outputs them to the interleaver and encoder 540.

The controller 550 controls the modem 510, the de-interleaver and decoder 520, the DSP 530 for processing speech signals, and the interleaver and encoder 540 of the MSM 50, and concurrently controls the LCD 100, the key input unit 110, and the memory 120.

The LCD 100 displays various screens to be displayed for the CDMA terminal user according to control by the controller 550 of the MSM 50. The key input unit 110 has a plurality of keys for inputting numbers and characters, and various function keys, and transmits the inputs of the CDMA terminal user to the controller 550.

The memory 120 comprises an electrically erasable programmable read only memory (EEPROM), a flash ROM, and a random access memory (RAM), and stores various data needed for the CDMA terminal according to control by the controller 550.

The SIM interface 130 connected to the controller 550 reads information stored in a SIM card and transmits it to the controller 550 when the SIM card for storing information on the GSM service subscribers is installed in a SIM cardholder 140, and the SIM interface 550 transmits the data output by the controller 550 to the SIM card.

When transmitting specific data including information on the GSM service subscribers stored in the SIM card through the antenna 10, the controller 550 transmits the same through a message transmission via a CDMA data burst channel, and receives specific data through the CDMA data burst message transmission.

In particular, when a GSM service subscriber installs the GSM service subscriber's SIM card in the SIM cardholder 140 and receives the roaming service in the CDMA service area, an authentication of the GSM service subscriber is required, and in this case, transmission and receiving of authentication data between a CDMA terminal and a base station can be performed through a CDMA data burst message transmission.

Figure 2:
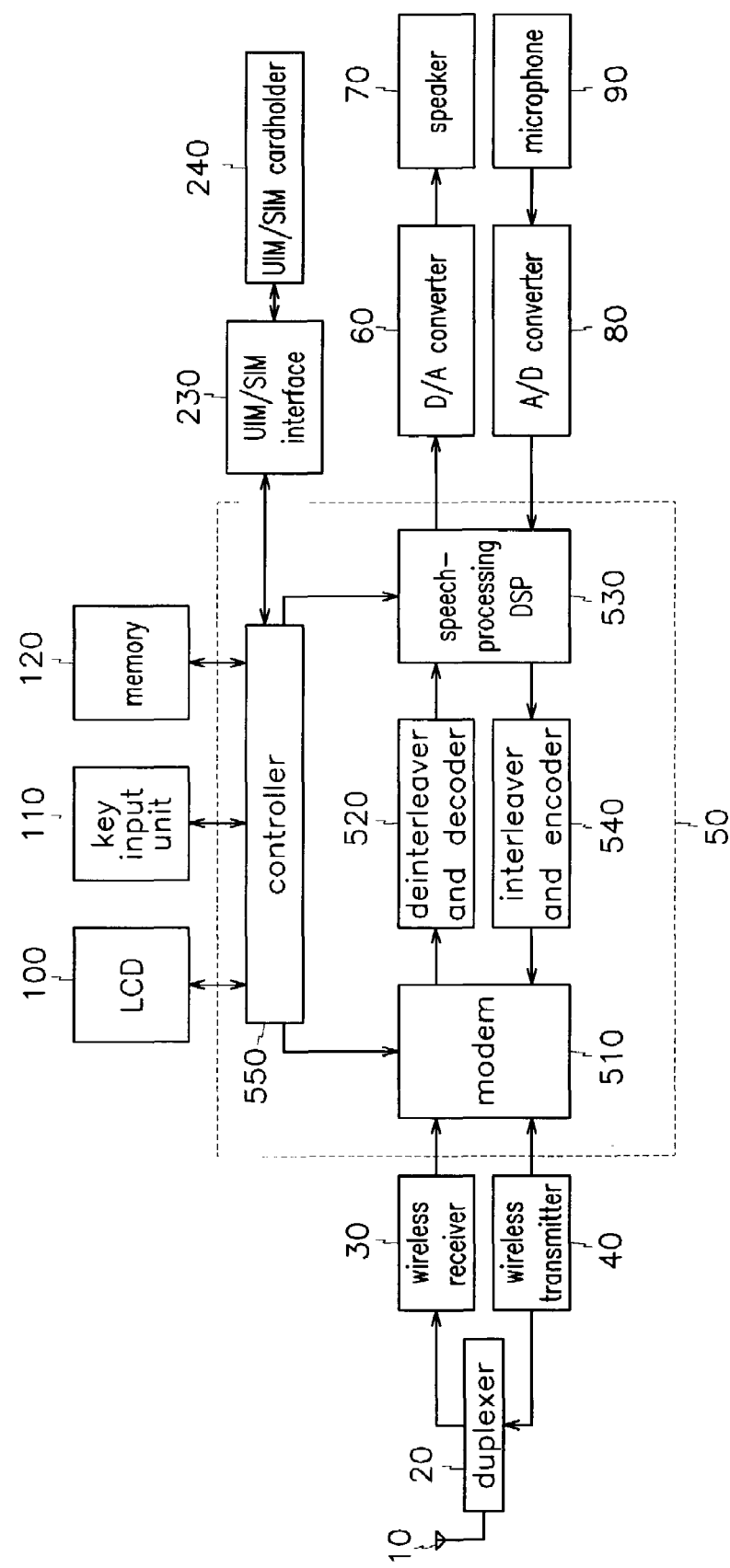
FIG. 2 shows a block diagram of a CDMA terminal that provides a roaming service to a GSM service subscriber in the CDMA service area according to a second preferred embodiment of the present invention.

FIG. 2 shows a block diagram of a CDMA terminal that provides a roaming service to a GSM service, subscriber in the CDMA service area according to a second preferred embodiment of the present invention.

As shown, when compared with the CDMA terminal according to the first preferred embodiment of the present invention, the CDMA terminal according to the second preferred embodiment of the present invention comprises a UIM/SIM interface 230 instead of the SIM interface 130, and a UIM/SIM cardholder 240 instead of the SIM cardholder 140, and it comprises other components identical with those of the first preferred embodiment of the present invention. Therefore, identical components of the first and second preferred embodiments will have identical reference numerals and no corresponding detailed descriptions will be provided.

In the second preferred embodiment of the present invention, since the SIM card has a size and a data interface identical with those of the UIM card, the UIM card can be used as well as the SIM card.

Hence, the UIM/SIM cardholder 240 can install a UIM card as well as a SIM card.

The UIM/SIM interface 230 detects whether a UIM card or a SIM card is installed in the UIM/SIM cardholder 240.

If a UIM card is detected to have been installed, the UIM/SIM interface 230 operates as a UIM interface between the UIM card and the controller 550, and if a SIM card is detected to have been installed, the UIM/SIM interface 230 operates as a SIM interface between the SIM card and the controller 550, and accordingly, the UIM/SIM interface 230 must comprise a circuit for detecting whether a UIM card or a SIM card is installed in the UIM/SIM cardholder 240. The circuit can be fabricated in various forms with respect to different information stored in the UIM card and the SIM card, which are well known to a skilled person.

Figure 3:
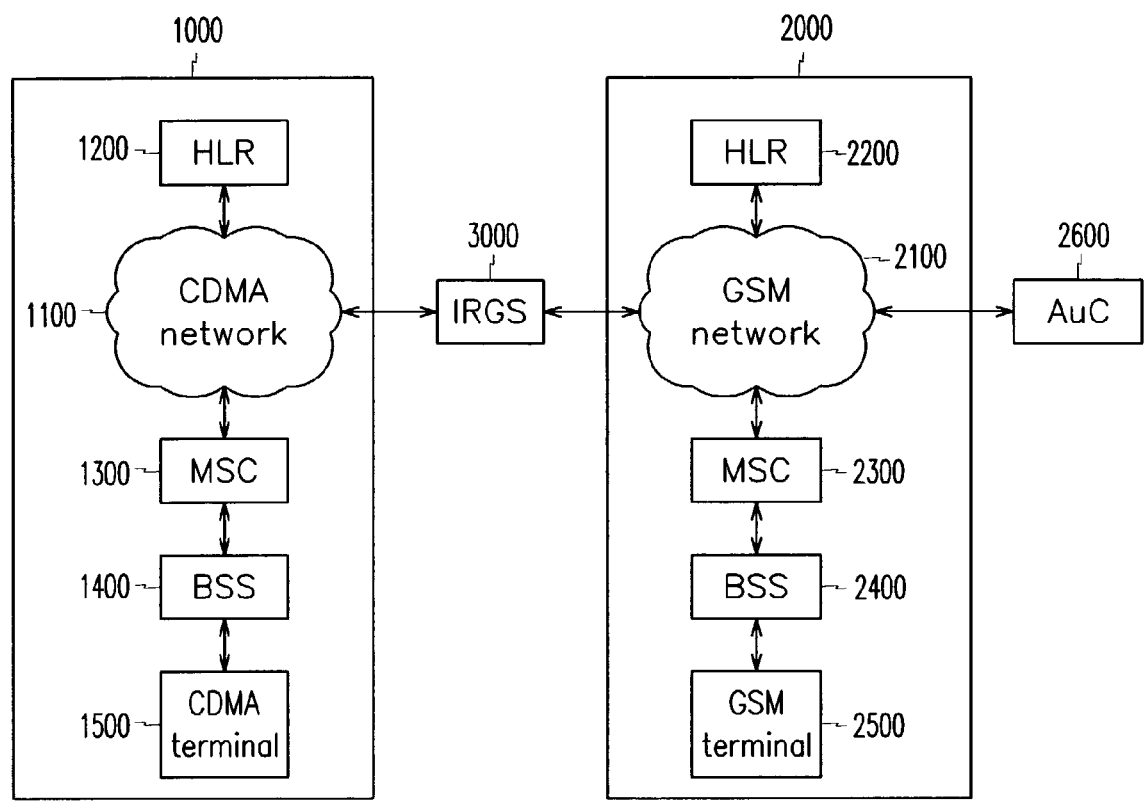
FIG. 3 shows a rough schematic diagram of a roaming service system for using a CDMA terminal that provides a roaming service to a GSM service subscriber in the CDMA service area.

FIG. 3 shows a rough schematic diagram of a roaming service system for using a CDMA terminal that provides a roaming service to a GSM service subscriber in the CDMA service area.

As shown, the roaming service system comprises a CDMA system 1000, a GSM system 2000, and an international roaming gateway system (IRGS) 3000 for connecting the CDMA system 1000 with the GSM system 2000.

The CDMA system 1000 comprises a home location register (HLR) 1200 connected to a CDMA network 1100, for storing information on the subscribers' locations and services; a mobile switching center (MSC) 1300 connected to the CDMA network 1100, for accessing calls; a base station system (BSS) 1400 connected to the MSC 1300, for interfacing between a wire network and a wireless network; and a CDMA terminal 1500 wirelessly connected to the BSS 1400 and being capable of having a SIM card installed therein. In this instance, the CDMA terminal 1500 can be a CDMA terminal of the first or the second preferred embodiment of the present invention as shown in FIG. 1 or 2.

The CDMA system 1000 comprises a plurality of HLRs and MSCs, which are interlinked to manage subscribers and exchange calls. An HLR is connected to a plurality of MSCs, and an MSC to a plurality of BSSs. Also, in addition to the above-noted components, the CDMA system 1000 may comprise an authenticating center (AuC) for authenticating the terminals; and a visit location register (VLR) provided in the MSC 1300, for storing information on visited subscribers.

The configuration of the GSM system 2000 is similar to that of the CDMA system 1000, and comprises an HLR 2200 connected to a GSM network 2100, for storing information on the subscribers' locations and services; an MSC 2300 connected to the GSM network 2100, for accessing calls; an AuC 2600 connected to the GSM network 2100, for authenticating the terminals; a BSS 2400 connected to the MSC 2300, for interfacing between the wire network and the wireless network; and a GSM terminal 2500 wirelessly connected to the BSS 2400.

The GSM system 2000 comprises a plurality of HLRs, MSCs, BSSs, and other components in the like manner of the CDMA system 1000.

The IRGS 3000, connected between the CDMA network 1100 and the GSM network 2100, converts signals to communicate signals between the two networks 1100 and 2100.

The IRGS 3000 functions as an HLR with respect to the CDMA system 1000 so as to manage profiles of GSM SIM subscribers, and functions as a VLR with respect to the GSM system 2000 so that the GSM system 2000 may detect locations of the GSM SIM subscribers with the IRGS 3000.

The CDMA terminal 1500 that accommodates the GSM SIM requires additional functions for transmitting and receiving data required by the GSM system 2000 to/from the BSS 1400.

One of the additional functions is to use CDMA data burst messages so as to deliver data to the GSM system 2000 that is needed for user authentication when registering the location of a roaming subscriber. By transmitting the messages through the CDMA data burst channel, modification of the present network is minimized and more roaming subscribers can be accommodated.

The message transmission through the CDMA data burst channel is used for transmitting short messages, and the CDMA data burst messages can use all CDMA wireless channels, any of which can transmit and receive data without modifying the network.

Next, an operation for installing a SIM card in a CDMA terminal 1500 that provides a roaming service to a GSM service subscriber in the CDMA service area, and in particular, an operation for a GSM service subscriber to move to a CDMA service area, install a SIM card in the CDMA terminal 150, and attempt to register a location will be described.

A process for attempting to register a location may be implemented through the following two methods.

The first is to apply the international mobile subscriber identity (IMSI), which is a number system used by the GSM system 2000 in connection with the CDMA system 1000.

The current Korean number system is the mobile identity number (MIN). In order to use the GSM SIM, the IMSI number system is applied to the CDMA system 1000. Therefore, under the premise that the CDMA system 1000 uses the IMSI, the CDMA system 1000 can register a location to the GSM system 2000 using the CDMA data burst messages.

The second is for the CDMA system 1000 to use the MIN instead of the IMSI number system.

Since the IMSI cannot be used in this case, a reserved MIN (referred to as a TMIN hereinafter) available to the CDMA system 1000 is assigned to the IMSI, a location is registered using the TMIN, and a call is then connected.

Figure 4:
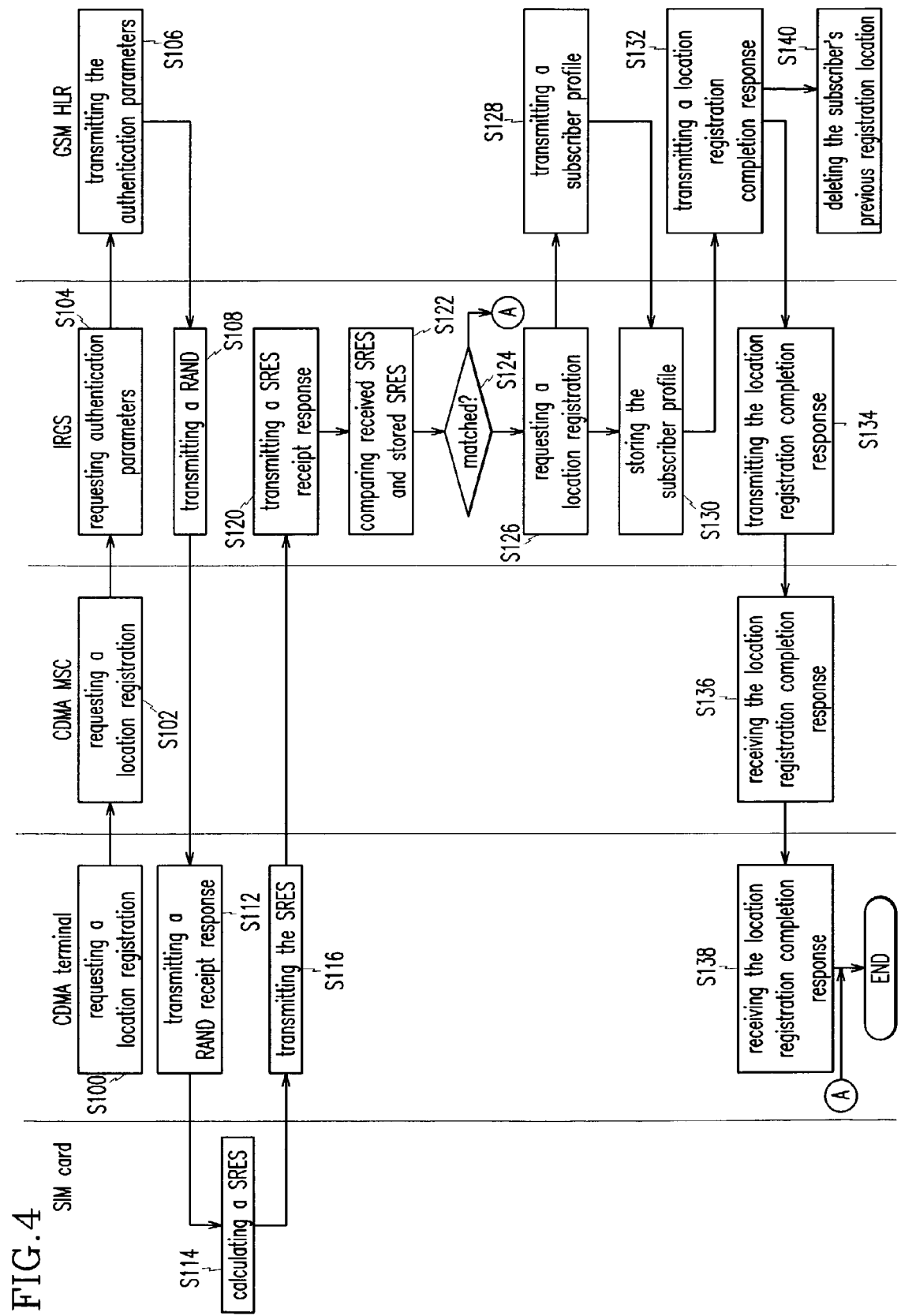
FIG. 4 shows a flowchart of a method for registering a location of a roaming service subscriber using a SIM card in the CDMA service area according to a third preferred embodiment of the present invention.
Figure 5:
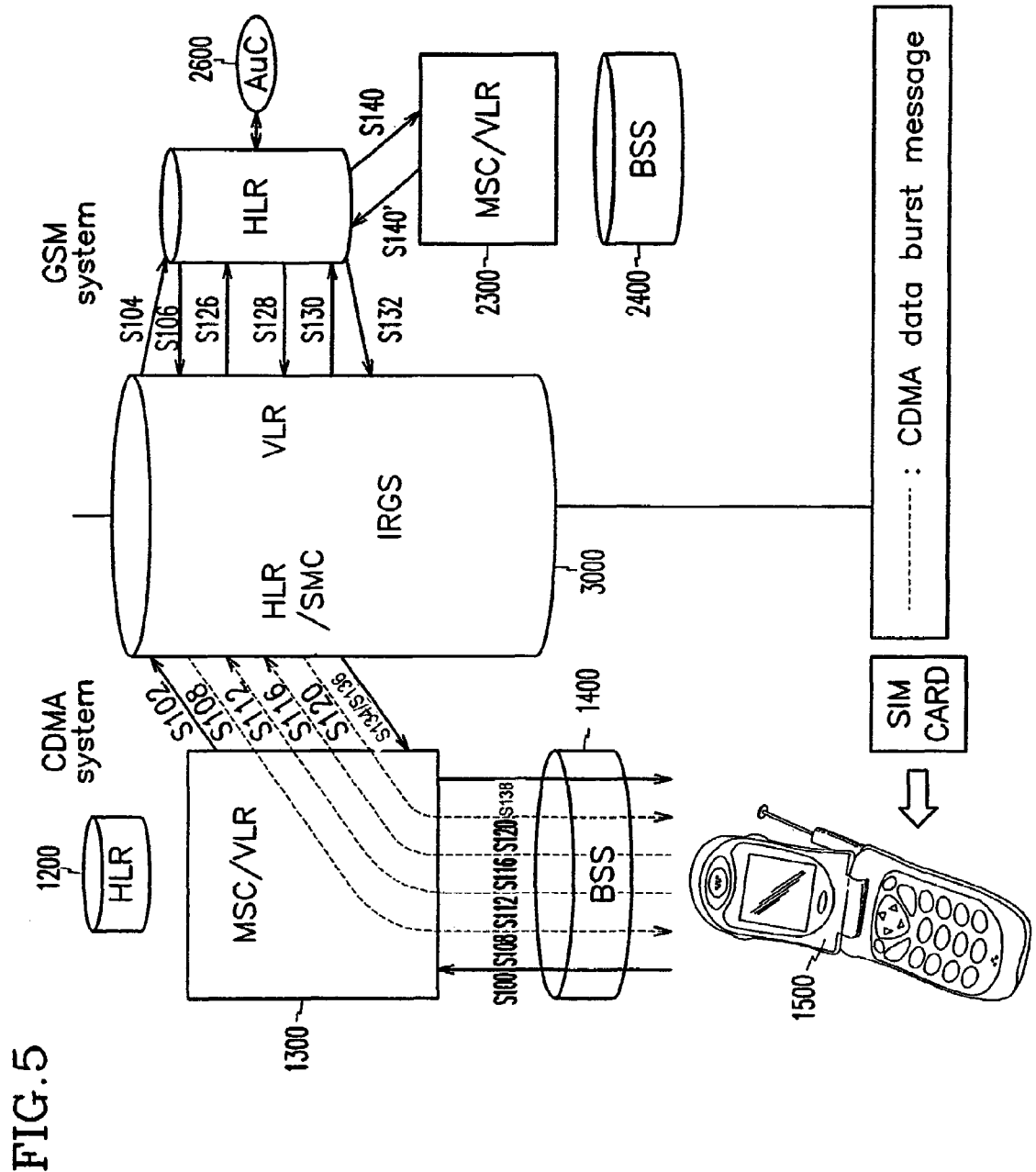
FIG. 5 shows the method for registering a location of a roaming service subscriber of FIG. 4 using the roaming service system of FIG. 3.

A third preferred embodiment for attempting to register a location according to the first method will be described with reference to FIGS. 4 and 5.

In the case a GSM SIM subscriber installs a SIM card in a CDMA terminal 1500 to roam to the CDMA system 1000, the corresponding terminal requests registration of a location of the subscriber in step S100. That is, when a SIM card is installed in the CDMA terminal 1500, the CDMA terminal 1500 detects an installation of the SIM card, reads necessary information including the IMSI from a subscriber profile stored in the SIM card, and transmits it to the BSS 1400, and the BSS 1400 transmits corresponding information to the MSC 1300 to request registration of a location in step S100.

A detailed description of the request for location registration follows. In this instance, the description is provided using the CDMA terminal of the first preferred embodiment of FIG. 1, but the CDMA terminal of the second preferred embodiment of FIG. 2 can also be used.

When a GSM SIM subscriber installs a SIM card in the SIM cardholder 1400 of the CDMA terminal 1500, the SIM interface 1300 detects that the SIM card is installed, and notifies the controller 550 of the MSM 50 of the installation. When notified, the controller 550 displays this fact to the LCD 100 to be viewed by a user, reads necessary information including the IMSI from the subscriber profile stored in the SIM card, and transmits the same to the BSS 1400 through the modem 510, the wireless transmitter 40, the duplexer 20, and the antenna 10 so as to perform a registration request. Hereinafter, even when a transmission path from the CDMA terminal 1500 to the BSS 1400 will not be described, the transmission path is still uniformly applied.

Next, when receiving a location registration request from the CDMA terminal 1500, the MSC 1300 requests location registration from the IRGS 3000 in step S102. That is, the MSC 1300 requests information including the IMSI from the CDMA terminal 1500 through the BSS 1400, and again transmits it to the IRGS 3000 so that a location registration request from the CDMA terminal 1500 is transmitted to the IRGS 3000. In this instance, the MSC 1300 determines the subscriber's HLR to be IRGS 3000 through the IMSI received from the CDMA terminal 1500.

After this, when receiving the location registration request, the IRGS 3000 determines that a subscriber authentication for the GSM system 2000 is needed since the subscriber who requires registration of a location is a GSM service subscriber, and the IRGS 3000 requests an authentication parameter from the HLR 2200 of the GSM system 2000 in step S104. Namely, the IRGS 3000 uses the IMSI received from the MSC 1300 to request an authentication parameter from the corresponding HLR 2200.

When receiving the authentication parameter from the IRGS 3000, the HLR 2200 of the GSM system 2000 transmits an authentication parameter acquired from the AuC 2600 to the IRGS 3000 in step S106. That is, the HLR 2200 of the GSM system 2000 transmits the authentication parameters acquired from the AuC 2600, such as SRES and RAND, which is a random number of an initial value of an authentication algorithm, to the IRGS 3000.

When receiving the authentication parameters from the HLR 2200 of the GSM system 2000, the IRGS 3000 transmits the authentication parameter RAND to the CDMA terminal 1500 through a CDMA data burst message in step S108. As described, by using the CDMA data burst message for transmitting the RAND, modification of the CDMA system 1000 is minimized.

In this instance, the CDMA terminal 1500 transmits a reply for notifying of receipt of the RAND to the IRGS 3000 using a CDMA data burst message, and accordingly, the IRGS 3000 can check that the RAND transmitted by the IRGS 3000 is transmitted to the CDMA terminal 1500 in step S112.

A further detailed corresponding operation will now be described.

The controller 550 in the MSM 50 of the CDMA terminal 1500 transmits the GSM service subscriber's location registration request to the BSS 1400, and stands by, and when the CDMA data burst message transmitted by the IRGS 3000 through the MSC 1300 and the BSS 1400 of the CDMA system is received through the antenna 10, the duplexer 20, the wireless receiver 30 and the modem 510, the controller 550 transmits a response that notifies whether the receiving of the corresponding data burst message has been normally completed by using the CDMA data burst message through a transmission path of the GSM system 1000. Subsequently, the transmission path from the BSS 1400 of the CDMA system 1000 to the CDMA terminal 1500 will be assumed to be identical with the above-noted one.

Next, the controller 550 of the CDMA terminal 1500 transmits the received RAND to the SIM card installed in the SIM cardholder 140 through the SIM interface 130, and the SIM card receives the RAND and performs an authentication process identical with that of the AuC 2600 of the GSM system 2000, calculates a result value SRES in step S114, and transmits the same to the controller 550 through the SIM interface 130, and the controller 550 receives the SRES and transmits it as a CDMA data burst message to the IRGS 3000 through a transmission path of the CDMA system 1000 in step S116.

The controller 550 temporarily stores the data transmitted by the SIM card through a transmission path and the data transmitted through a receiving path in the memory 120, and concurrently performs a transmitting and receiving process.

Next, when receiving the SRES from the CDMA terminal 1500, the IRGS 3000 uses a CDMA data burst message to transmit an SRES-receiving response to the CDMA terminal 1500 so that it is known that the SRES transmitted by the CDMA terminal 1500 is finally transmitted to the IRGS 3000 in step S120.

When receiving the SRES calculated according to the transmitted RAND, the IRGS 3000 compares the SRES received from the HLR 2200 of the GSM system 2000 with the SRES calculated by the SIM card and received in step S122, and when the two values are not matched, it means that the user is not correct, and accordingly, the IRGS 3000 notifies the CDMA terminal 1500 of a location registration failure and terminates the location registration process. In this instance, the controller 550 of the CDMA terminal 1500 displays the location registration failure on the LCD 100 to be viewed by the user, and the user may delete the failure message through the key input unit 110 or perform another task. Here, the notification of the location registration failure of the user can be executed by outputting speech such as "You failed to register your location." through the speaker 70.

However, when the two values are matched in step S124, the IRGS 3000 determines the subscriber who requests a location registration to be a correct person, and requests a location registration from the HLR 2200 of the GSM system 2000 in step S126.

Next, when receiving the location registration request from the IRGS 3000, the HLR 2200 of the GSM system 2000 transmits the corresponding subscriber's profile to the IRGS 3000 in step S128. That is, the HLR 2200 of the GSM system 2000 recognizes the IRGS 3000 as a VLR of the GSM system 2000, stores that the current location of the roaming service subscriber is one whereby the IRGS 3000 is being used, and transmits the current subscriber profile to the IRGS 3000 so as to provide the service to the corresponding roaming service subscriber.

The IRGS 3000 generates a response to the receipt of the subscriber profile transmitted by the HLR 2200 of the GSM system 2000, and stores the corresponding profile in step S130. In this instance, when the IRGS 3000 transmits the response to the receipt of the subscriber profile to the HLR 2200 of the GSM system 2000, the HLR 2200 receives the response to the subscriber profile transmission, transmits a location registration completion response to the IRGS 3000 in step S132, and the IRGS 3000 transmits the location registration completion response to the MSC 1300 of the CDMA system 1000 in step S134. The corresponding MSC 1300 then transmits the location registration completion response to the CDMA terminal 1500 in step S136, and hence, the location registration of the GSM roaming service subscriber in the CDMA service area is terminated. In this instance, in a manner like the location registration failure notification, the controller 550 of the CDMA terminal 1500 displays the location registration success notification on the LCD 100 to be viewed by the user, and the user may delete the success message through the key input unit 110 or perform another task. Here, the notification of the location registration success of the user can be executed by outputting speech such as "You have succeeded in registering your location." through the speaker 70.

In this instance, the HLR 2200 of the GSM system 2000 must delete the location registered before the roaming service subscriber roams to the CDMA service area in step S140. That is, the HLR 2200 of the GSM system 2000 requests the VLR in the MSC 2300 of the GSM system 2000 to delete the location of the subscriber registered before roaming into the CDMA service area, and the VLR in the MSC 2300 of the GSM system 2000 deletes the corresponding subscriber's previous location in step S140.

Figure 6:
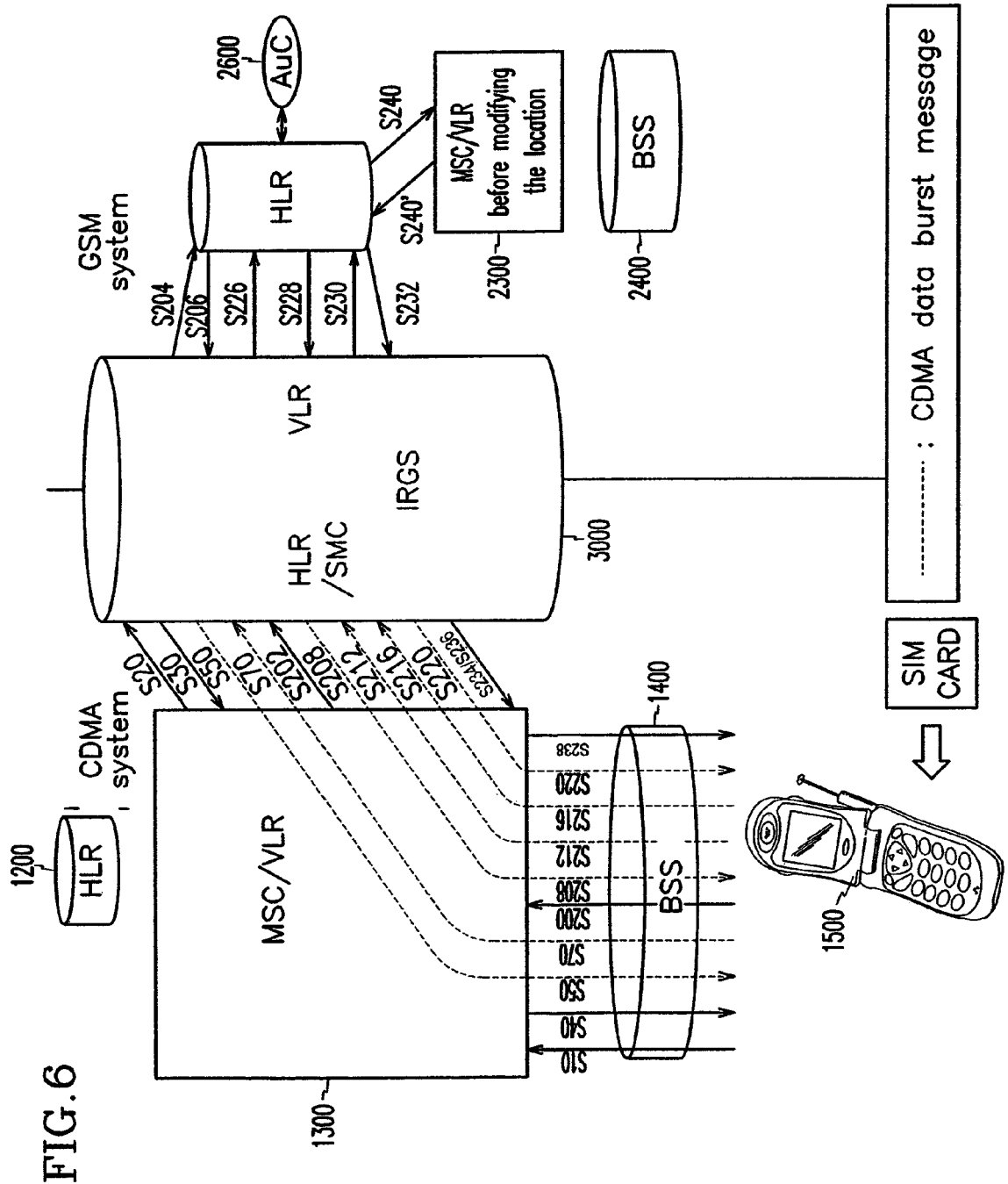
FIG. 6 shows a flowchart of a method for registering a location of a roaming service subscriber using a SIM card in the CDMA service area according to a fourth preferred embodiment of the present invention.

Next, with reference to FIG. 6, a fourth preferred embodiment for attempting to register a location according to the second method will be described. In this case, since the operation of the CDMA terminal 1500 is described in detail in the third preferred embodiment, no further description will be provided.

Since the process for attempting the location registration is similar to that of the third preferred embodiment, only portions that are different will be described.

Here, since the CDMA system 1000 does not support the IMSI number system stored in the SIM card, the IMSI cannot be used, and accordingly, when the GSM roaming service subscriber installs a SIM card in the CDMA terminal 1500, the CDMA terminal 1500 reads necessary information including the IMSI from the SIM card, and transmits it to the MSC 1300 through the BSS 1400 of the CDMA system 1000 in step S10.

The MSC 1300 of the CDMA system 1000 transmits information including the IMSI received from the CDMA terminal 1500 to the IRGS 3000 in step S20, the IRGS 3000 transmits a response to the receipt of the corresponding information to the MSC 1300 of the CDMA system 1000 in step S30, and the MSC 1300 transmits the response to the receipt of the corresponding information to the CDMA terminal 1500 in step S40.

Next, the IRGS 3000 assigns a TMIN corresponding to the information including the received IMSI, and uses a CDMA data burst message to transmit the same to the CDMA terminal 1500 in step S50. In this instance, the TMIN corresponding to the received IMSI is stored in the IRGS 3000, and when a TMIN is received in a subsequent process, the IMSI stored corresponding to the corresponding TMIN is used to attempt a communication with the GSM system 2000.

When receiving the TMIN from the IRGS 3000, the CDMA terminal 1500 transmits a TMIN receipt response to the IRGS 3000 using a CDMA data burst message, and stores a corresponding TMIN in step S70. After this, the CDMA terminal 1500 uses the TMIN provided by the IRGS 3000 to receive a roaming service.

Subsequent location registration processes are similar to those of the third preferred embodiment, and the IMSI is used when transmitting messages to the IRGS 3000 from the CDMA terminal 1500 in the third preferred embodiment, but in the present preferred embodiment, only the TMIN provided by the IRGS 3000 is used.

A further detailed description will be provided.

Initially, the CDMA terminal 1500 transmits a location registration request on a GSM service subscriber to the MSC 1300 of the CDMA system 1000 in step S200. That is, the CDMA terminal 1500 transmits the TMIN stored for a location registration request to the MSC 1300 through the BSS 1400 of the CDMA system 1000.

Next, when receiving the location registration request from the CDMA terminal 1500, the MSC 1300 of the CDMA system 1000 requests a location registration from the IRGS 3000 in step S202. That is, the MSC 1300 of the CDMA system 1000 receives the TMIN from the CDMA terminal 1500 through the BSS 1400, and transmits it to the IRGS 3000 so that the location registration request from the CDMA terminal 1500 may be transmitted to the IRGS 3000.

After this, when receiving the location registration request, the IRGS 3000 recognizes that a subscriber authentication on the GSM system 2000 is required since the subscriber who requires a location registration is a GSM service subscriber, and it requests authentication parameters from the HLR 2200 of the GSM system 2000 in step S204. That is, the IRGS 3000 holds the IMSI corresponding to the TMIN received from the MSC 1300 of the CDMA system 1000 and requests the authentication parameters from the corresponding HLR 2200.

After this, the steps S106, S108, S112, and S114 according to the third preferred embodiment are applied to the steps S206, S208, S212, and S214, according to the present preferred embodiment.

Next, the steps S116, S118, and S120 are identically performed in the steps S216, S218, and S220, except that the TMIN is used instead of the IMSI.

Next, the steps S122, S124, S126, S128, S130, S132, S134, S138, S140, and S140' according to the third preferred embodiment are executed according to the present preferred embodiment with the steps S226, S228, S230, S232, S234, S236, S238, S240, and S240' corresponding to steps S126, S128, S130, S132, S134, S138, S140, and S140' so that the GSM service subscriber's roaming service subscriber location registration in the CDMA service area is completed.

When installing a SIM card in the CDMA terminal in the CDMA service area and applying the above-described preferred embodiments to the location registration operation of the roaming service subscriber, the step for a GSM service subscriber to attempt to register a location when the subscriber moves in the CDMA service area, the step for the GSM service subscriber to attempt to register a location when the subscriber uses the roaming service in the CDMA service area and returns to the home GSM service area, the step for the roaming service subscriber to generate a call in the CDMA service area, and the step for the roaming service subscriber to perform the short message service, will be easily understood by a skilled person.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, in the preferred embodiments of the present invention, the GSM SIM card is installed in the CDMA terminal, but when referring to the present embodiments, a step for using a GSM terminal that can have a UIM card installed and receiving a roaming service in the GSM service area will be easily understood.

According to the present invention, the GSM service subscriber can use his own SIM card and number in the CDMA service area.

Also, by using a CDMA data burst message and performing location registration with the GSM system, modification of the existing network is minimized, and accordingly, the roaming service by the GSM SIM card is possible.

What is claimed is:

1. A code division multiple access (CDMA) terminal comprising: a cardholder for installing and uninstalling a user identity module (UIM) of a CDMA service subscriber; and a card interface for detecting whether a UIM card is installed in the cardholder, wherein when the card interface detects that the UIM card of the CDMA service subscriber is installed in the cardholder in the CDMA service area, the CDMA service subscriber can use the CDMA service, and the cardholder can install or uninstall a subscriber identity module (SIM) card of a global system for mobile communications (GSM) service subscriber, and the card interface can detect whether the SIM card is installed in the cardholder such that the same cardholder is capable of alternately receiving both the SIM card and the UIM card, and when the card interface detects that the SIM card of the GSM service subscriber is installed in the cardholder in the CDMA service area, specific data are transmitted using a CDMA message in the case of authenticating the GSM service subscriber using information of the GSM service subscriber stored in the SIM card, and when the authentication of the GSM service subscriber is normally completed, the CDMA terminal operates as a roaming terminal for the GSM service subscriber in the CDMA service area.

2. The CDMA terminal of claim 1, wherein the CDMA terminal comprises:
 a wireless signal transmitter for transmitting and receiving wireless signals;
 a mobile station modem (MSM) connected to the wireless signal transmitter and the card interface, for controlling the CDMA terminal;
 a speaker for outputting speech data output by the MSM to a CDMA terminal user in a speech format;
 a microphone for converting the speech input by the CDMA terminal user into speech data, and outputting them to the MSM;
 a liquid crystal display (LCD) connected to the MSM, for displaying information to the CDMA terminal user;
 a key input unit for receiving a key input of the CDMA terminal user, and transmitting it to the MSM; and
 a memory connected to the MSM, for storing various data.

3. The CDMA terminal of claim 1, wherein the card interface comprises a circuit for detecting whether a UIM card or a SIM card is installed in the cardholder.

4. A system for providing code division multiple access (CDMA) service to a global system for mobile communications (GSM) subscriber in a service area of a CDMA network, the system comprising:
 an international roaming gateway system (IRGS) for connecting a GSM network of the GSM subscriber and the CDMA network, wherein the IRGS is configured to function both as a visitor location register (VLR) for the GSM network and as a home location register (HLR) for the CDMA network in instances in which a subscriber identity module (SIM) of the GSM subscriber has been installed in a CDMA terminal within the service area of the CDMA network; and
 a CDMA terminal having a cardholder and a card interface device for detecting which one, if any, of a user identity module (UIM) of a CDMA subscriber and the SIM of the GSM subscriber is installed in the cardholder and providing CDMA service to either of the CDMA subscriber and the GSM subscriber, thereby permitting the same cardholder to be capable of alternately receiving both the SIM and the UIM.

5. The system of claim 4 wherein the IRGS is configured to receive a location registration request from the CDMA terminal that includes an international mobile subscriber identity (IMSI) identifying the SIM of the GSM subscriber.

6. The system of claim 5 wherein the IRGS is configured to requests an authentication parameter from the GSM network based upon the IMSI.

7. The system of claim 6 wherein the authentication parameter comprises an SRES parameter and a RAND parameter, wherein the IRGS is configured to provide the RAND parameter to the CDMA terminal and to receive another SRES parameter from the CDMA terminal in response to the provision of the RAND parameter, and wherein the IRGS is configured to request the HLR in the GSM system to send the authentication parameter regarding the CDMA terminal, and to store the authentication parameter received by the HLR in response to the request, and to compare the SRES parameters in order to verify the GSM subscriber.

8. The system of claim 5 wherein the IRGS determines and stores a reserved mobile identity number (TMIN) in response to receipt of the IMSI.

* * * * *

UNITED STATES PATENT AND TRADEMARK OFFICE
CERTIFICATE OF CORRECTION

PATENT NO. : 7,043,238 B2  Page 1 of 1
APPLICATION NO. : 10/089010
DATED : May 9, 2006
INVENTOR(S) : Ahn et al.

It is certified that error appears in the above-identified patent and that said Letters Patent is hereby corrected as shown below:

<u>Title page,</u>
Insert the following,
--(30) Foreign Application Priority Data
March 26, 2001 (KR) 2001-15601--.

Signed and Sealed this

Fourteenth Day of November, 2006

JON W. DUDAS
*Director of the United States Patent and Trademark Office*